United States Patent
Kashimura et al.

Patent Number: 5,274,756
Date of Patent: Dec. 28, 1993

[54] OUTLINE COMPENSATION CIRCUIT

[75] Inventors: Naoki Kashimura; Takamitsu Sakai, both of Tokyo, Japan

[73] Assignee: Ikegami Tsushinki Co., Ltd., Tokyo, Japan

[21] Appl. No.: 19,819

[22] Filed: Feb. 18, 1993

Related U.S. Application Data

[63] Continuation of Ser. No. 584,083, Sep. 18, 1990, abandoned.

[30] Foreign Application Priority Data

Sep. 19, 1989 [JP] Japan .................. 1-240532

[51] Int. Cl.$^5$ ............................................. G06F 15/20
[52] U.S. Cl. .................................. 395/142; 395/141; 345/144
[58] Field of Search ............... 395/119, 121, 128, 129, 395/140, 141, 142, 143, 730, 733, 742

[56] References Cited

U.S. PATENT DOCUMENTS

| | | | |
|---|---|---|---|
| 5,047,954 | 9/1991 | Corona et al. | 364/518 |
| 5,086,482 | 2/1992 | Kumagai | 381/25 |
| 5,136,689 | 8/1992 | Waller | 395/143 |

OTHER PUBLICATIONS

"A Digital Contour-Corrector For A High-Definition TV Camera" Okada, NHK Science and Technical Research Laboratories, Jan. 1985, pp. 2-15.

Primary Examiner—Phu K. Nguyen
Attorney, Agent, or Firm—Spencer, Frank & Schneider

[57] ABSTRACT

An outline compensation circuit comprising: a first coefficient multiplier for reducing a level of an image signal by one half and reversing the polarity thereof; a first delay circuit for delaying by $2\tau$ the signal from the first coefficient multiplier; a first adder for adding the signal from the first delay circuit to the image signal; a second delay circuit for delaying the signal from the first adder by $2\tau$; a second adder for adding the signal delayed by the second delay circuit to the signal from the first coefficient multiplier to output a second-order differential signal of the image signal; a first non-linear converter for calculating the square root of the second-order differential signal from the second adder; a subtractor for subtracting the signal from the first delay circuit from the signal from the first coefficient multiplier to output a first-order differential signal of the image signal; an absolute value calculating circuit for calculating the absolute value of the first-order differential signal from the subtractor; a third delay circuit for delaying the signal from the absolute value calculating circuit by $\tau$; a second non-linear converter for calculating the square root of the signal from the third delay circuit; and a multiplier for multiplying the signal from the second non-linear converter with the signal from the non-linear converter to output an outline compensation signal, whereby outline compensation can be carried out naturally.

4 Claims, 4 Drawing Sheets

FIG.4A
FIG.4B
FIG.4C
FIG.4D
FIG.4E
FIG.4F
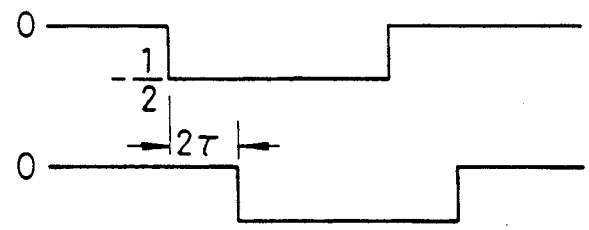
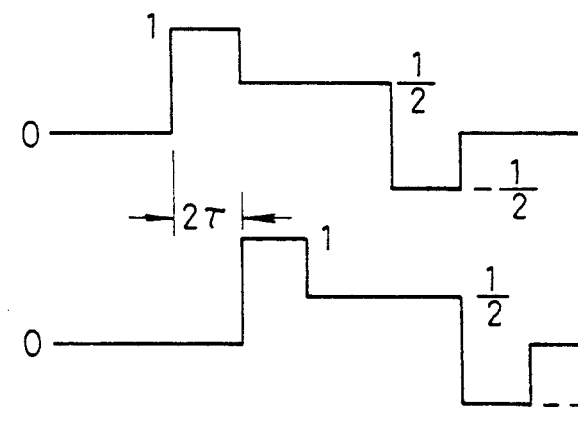
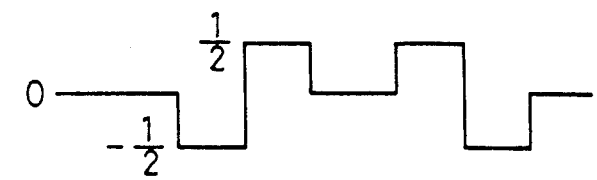

OUTLINE COMPENSATION CIRCUIT

This application is a continuation of application Ser. No. 07/584,083, filed Sep. 18, 1990, now abandoned.

BACKGROUND OF THE INVENTION

1. Field of the Invention

The present invention relates to an outline compensation circuit.

2. Description of the Prior Art

FIG. 3 shows an example of a conventional outline compensation circuit.

In FIG. 3, reference numerals 1 and 3 denote coefficient multipliers as first coefficient means which reduces the level of an image signal by one half (½) and also reverse the polarity thereof. Reference numeral 2 denotes a coefficient multiplier which provides the image signal as an output without any modification or change in the level and the polarity thereof. Reference numeral 4 denotes a delay circuit as first delaying means which delays the signal of the coefficient multiplier 1 by 2τ (τ=¼f, f: emphasizing frequency). Reference numeral 5 denotes an adder as first adding means which adds the signal delayed by 2τ by the delay circuit 4 to the original image signal of the coefficient multiplier 2. Reference numeral 6 denotes a delay circuit as second delaying means which delays the signal from the adder 5 by 2τ. Reference numeral 3 denotes an adder which adds the output signal from the coefficient multiplier 3 to the output signal from the delay circuit 6 to output a second-order differential signal of the original image signal.

The level of the signal shown in FIG. 4A is reduced by one half (½) as well as reversed in polarity by the respective coefficient multipliers 1 and 3, but is not modified or changed by the coefficient multiplier 2. The waveform of the output signal of the coefficient multiplier 1 is shown in FIG. 4B. The signal from the coefficient multiplier 1 is delayed by 2τ by the delay circuit 4, and then is added to the signal from the coefficient multiplier 2 by the adder 5. The waveform of the output signal from the delay circuit 4 is shown in FIG. 4C, and the waveform of the output signal from the adder 5 is shown in FIG. 4D.

Next, the output signal from the adder 5 is delayed by 2τ by the delay circuit 6, and the signal delayed by 2τ and the signal from the coefficient multiplier 3 are added to each other by the adder 7. The waveform of the output signal from the delay circuit 6 is shown in FIG. 4E and the waveform of the output signal from the adder 7 is shown in FIG. 4F.

In the conventional outline compensation circuit, there is a drawback in that, because there is a relationship f=¼τ between the emphasizing frequency f and the width τ of the outline compensation signal, the outline compensation signal produced when emphasizing the low frequency component, which has the visual effect of emphasizing the outline, widens the width of the outline. In the outline portion having a great difference in the brightness of the image signal, for instance, in an image in which a face of a human being is in the whitish background, an emphasized edge appears unnaturally in the face of the human being, thereby resulting in losing the sharpness of the image.

For example, when emphasizing a 2 MHz component, an outline signal has a width of 250 ns, i.e., an outline edge having a width corresponding to 4 picture cells in terms of CCD at 14.32 MHz is obtained.

In the conventional outline compensation circuit, it is impossible to reduce only the width of the outline signal to one half of the width of the outline signal processed as mentioned above without changing the emphasizing frequency.

Accordingly, a thick edge appears on the screen of a large-sized projector or a large-sized monitor, thereby giving unnatural outline compensation.

SUMMARY OF THE INVENTION

An object of the present invention is to solve such problems as mentioned above, and to provide an outline compensation circuit which achieves natural outline compensation by reducing the width of an outline edge to one half of that obtained by the prior art outline compensation, without changing the emphasizing frequency.

In an outline compensation circuit according to the present invention, first coefficient means reduces the level of an image signal by one half (½) and reverses the polarity thereof. First delaying means delays the signal obtained from the first coefficient means by a predetermined time period. First adding mean adds the signal delayed by the predetermined time period by the first delaying means to the original image signal. Second delaying means delays the signal obtained from the first adding means by the same time period as the above-mentioned predetermined time period. Second adding means adds the signal delayed by the same time period as the above-mentioned time period by the second delaying means to the signal from the first coefficient means to output a second-order differential signal of the image signal. The ½ power or square root of the second-order differential signal obtained from the second adding means is calculated by first non-linear converting means. The signal from the first delaying means is subtracted from the signal from the first coefficient means by subtracting means to output a first-order differential signal of the image signal. The absolute value of the first-order differential signal obtained from the subtracting means is calculated by absolute value calculating means. The signal from the absolute value calculating means is delayed by a time period equal to one half (½) of the above-mentioned predetermined time period by third delaying means. The ½ power or square root of the signal delayed by the ½ time period of the above-mentioned predetermined time period by the third delaying means is calculated by second non-linear converting means. Multiplying means multiplies the signal from the second non-linear converting means with the signal from the first non-linear converting means to output an outline compensation signal.

The above and other objects, effects, features and advantages of the present invention will become more apparent from the following description of embodiments thereof taken in conjunction with the accompanying drawings.

BRIEF DESCRIPTION OF THE DRAWINGS

FIGS. 4A-4F illustrate waveforms of signals at various portions in FIG. 3.

DETAILED DESCRIPTION OF PREFERRED EMBODIMENTS

Figure 1:
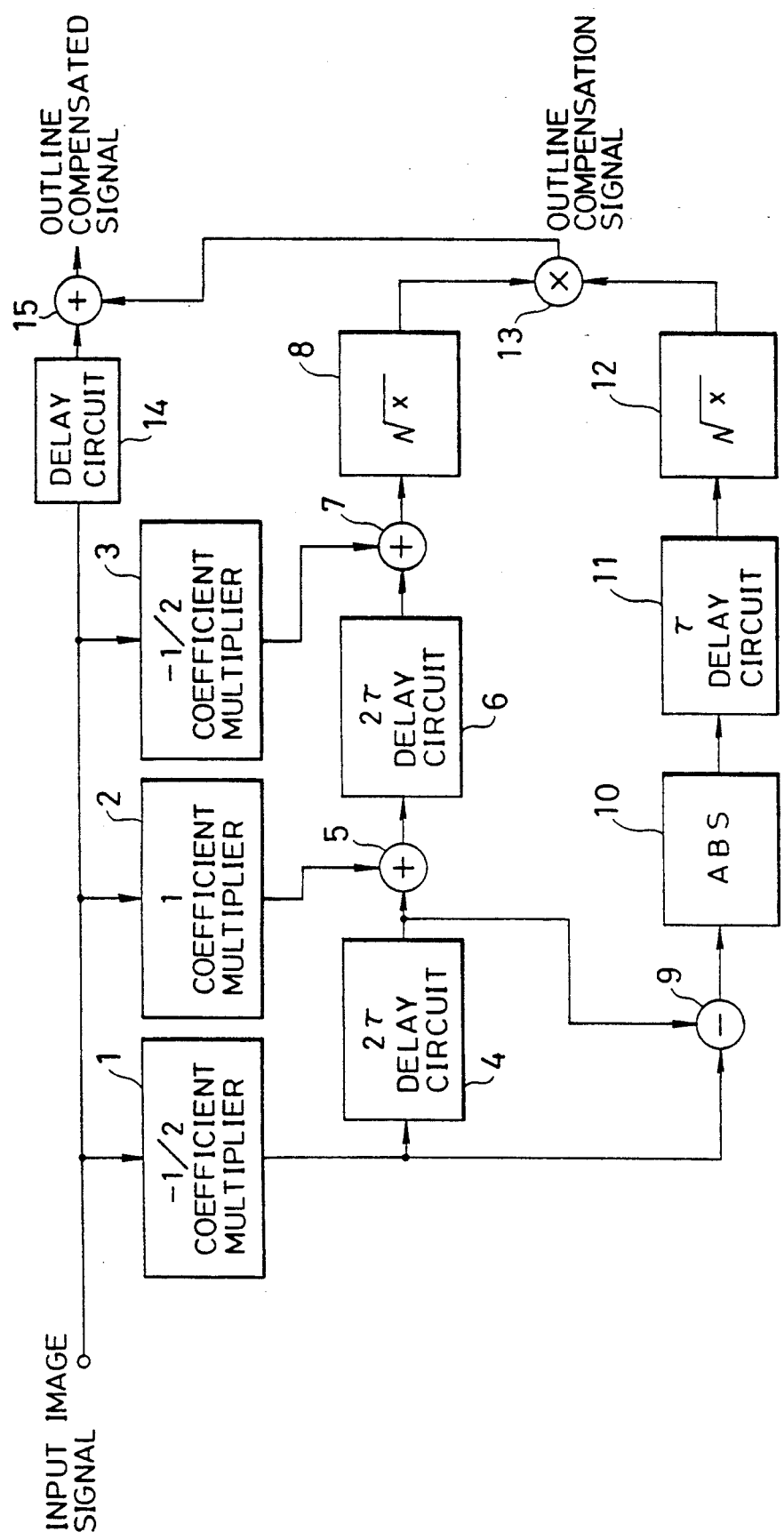
FIG. 1 is a block diagram showing an embodiment of an outline compensation circuit according to the present invention.

FIG. 1 shows an embodiment of an outline compensation circuit for compensation in the horizontal direction according to the present invention.

Figure 3:
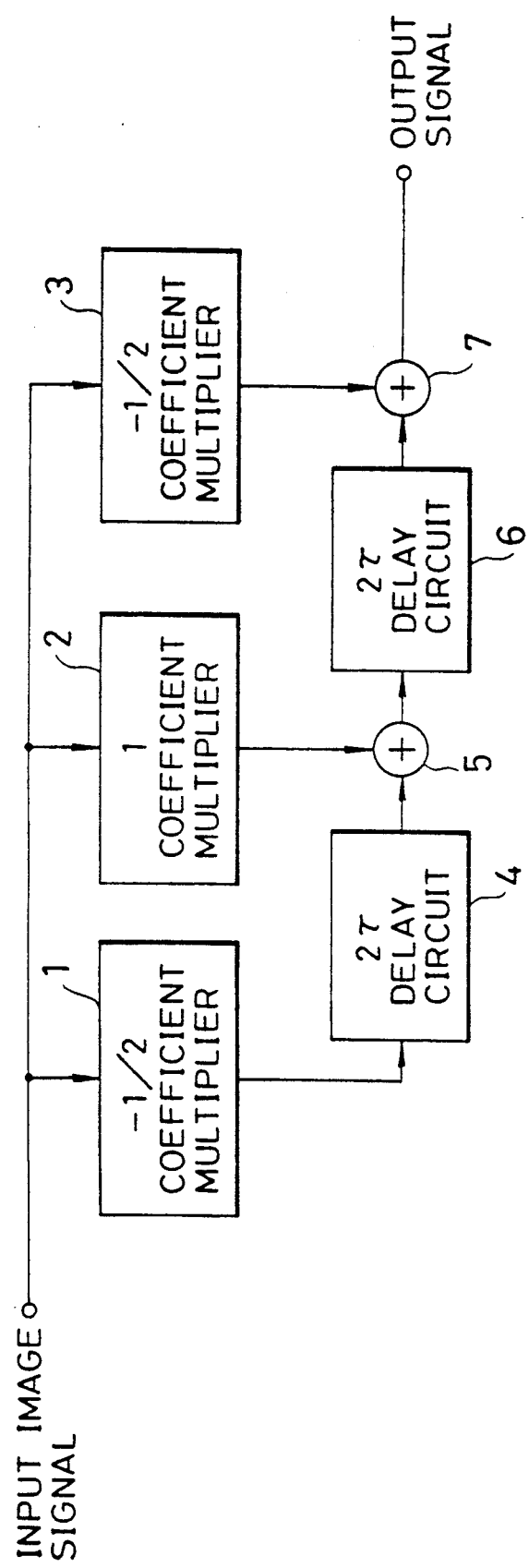
FIG. 3 is a block diagram showing an example of a conventional outline compensation circuit.

In FIG. 1, reference numerals 1 to 7 denote similar elements to those shown in FIG. 3. Reference numeral 8 denotes a non-linear converter as the first non-linear converting means, which calculates the $\frac{1}{2}$ power or the square root of the second-order differential signal from the adder 7. Reference numeral 9 denotes a subtractor as the subtracting means which subtracts the signal from the delay circuit 4 from the signal from the coefficient multiplier 1 to output a first-order differential signal of the original image signal. Reference numeral 10 denotes an absolute value circuit as the absolute value calculating means which calculates the absolute value of the first-order differential signal from the subtractor 9. Reference numeral 11 denotes a delay circuit as the third delaying means which delays the signal from the absolute value circuit 10 by $\tau$. Reference numeral 12 denotes a non-linear converter as the second non-linear converting means which calculates the $\frac{1}{2}$ power or the square root of the signal from the delay circuit 11. Reference numeral 13 denotes a multiplier as the multiplying means which multiplies the signal from the non-linear converter 8 with the signal from the non-linear converter 12.

Figure 2A:
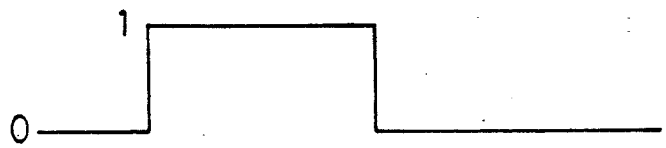
FIGS. 2A–2G illustrate waveforms of signals at various portions in FIG. 1.
Figure 2B:
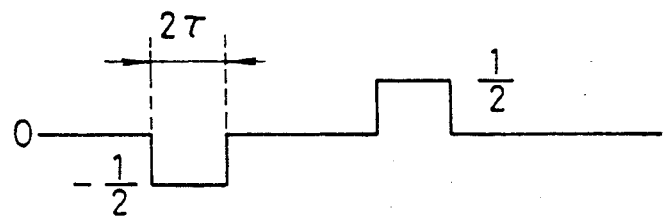

The operation of the outline compensation circuit of this embodiment will be explained. It is assumed that the waveform of an original or input signal is as shown in FIG. 2A. The waveform of the first-order differential signal from the subtractor 9 is as shown in FIG. 2B, and the waveform of the signal from the absolute value circuit 10 is as shown in FIG. 2D. The signal shown in FIG. 2D is delayed by the delay circuit 11, and the output from the delay circuit 11 is delayed by $\tau$ with respect to the signal shown in FIG. 2D, as shown in FIG. 2E. Then, the output signal from the delay circuit 11 is processed to obtain the $\frac{1}{2}$ power or the square root of the signal from the delay circuit 11 by the non-linear converter 12. The output from the converter 12 is inputted to the multiplier 13. The input image signal is supplied to a delay circuit 14 from which a delayed image signal delayed by $2\tau + \alpha$ is obtained. Here, the delay time $\alpha$ is so determined that $\alpha$ is equal to the overall transmission delay time in the outline compensation circuit. The delayed image signal and the outline compensation signal from the multiplier 13 are supplied to an adder 15 from which an outline-compensated image signal is derived.

Figure 2C:
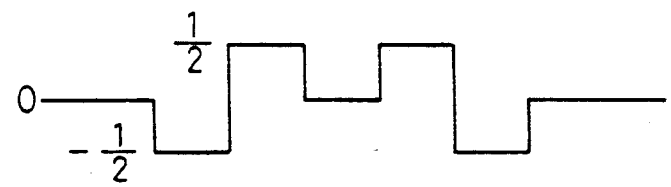
Figure 2D:
Figure 2E:
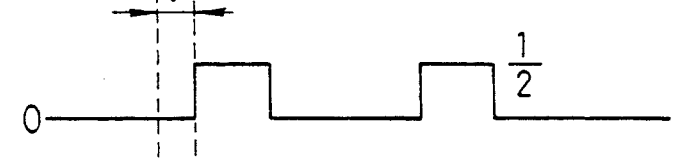

On the other hand, the waveform of the signal from the adder 7 is as shown in FIG. 2C, and this signal is processed to obtain the $\frac{1}{2}$ power or the square root of the signal from the adder 7 by the non-linear converter 8. The output from the converter 8 is inputted to the multiplier 13.

Figure 2F:
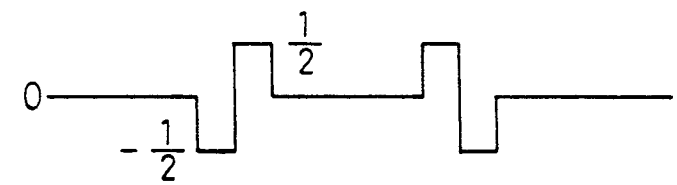
Figure 2G:
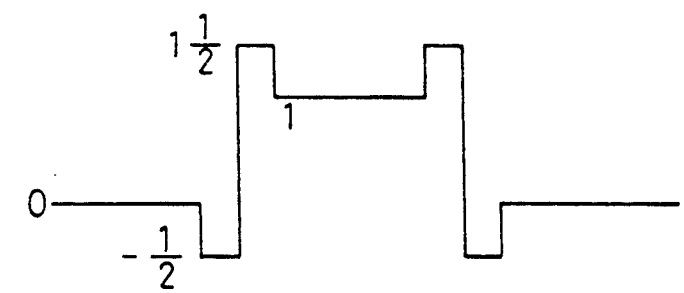

The signals from the non-linear converters 8 and 12 are multiplied by the multiplier 13, from which an outline compensation signal as shown in FIG. 2F is outputted. The outline-compensated signal is obtained from the adder 15 in which the outline compensation signal is added to the main line signal, the phase of which is adjusted by the delay circuit 14 so that the phase of the input image signal matches the phase of the outline compensation signal. The waveform of the outline-compensated signal is as shown in FIG. 2G.

Further, when a line memory of 2H (H: horizontal scanning period) is used in place of the delay circuits 4 and 6 of $2\tau$ and a line memory of H is used in place of the delay circuit 11 of $\tau$, the outline can be compensated in the vertical direction.

With the above-mentioned arrangement, according to the present invention, the outline of the displayed picture can be compensated so that a natural outline is obtained. Furthermore, a linear amplitude characteristic is realized. Further, if the square roots of both the first-and second-order differential signals are not derived, the following disadvantage occurs. That is, in the case that both the first and second order differential signals have a linear characteristic such as $Y=X$, for instance, a characteristic of $Y=X^2$ is obtained so that the signal is compressed in the vicinity of the black level. With this in view, in the present invention, the square roots of both the signals are derived and then the square roots are multiplied by each other, so that an outline compensation signal having a linear amplitude characteristic is obtained.

That is, the present invention recognized the fact that the emphasizing frequency does not change, even if the first-order differential signal is multiplied by the second-order differential signal with the understanding, the square root of the signal obtained by delaying by one half ($\tau$) of the predetermined time period the absolute signal of the first-order differential signal is multiplied by the square root of the second-order differential signal, so that the width of the outline signal is reduced to one half of that obtained by the prior art without varying the emphasizing frequency.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. An outline compensation circuit for receiving an input image signal and for outputting an outline-compensated image signal so that an outline of an image represented by said input image signal is emphasized without emphasizing a level of a frequency component corresponding to said outline, said outline compensation circuit comprising:

coefficient means for reducing a level of the input image signal by one half and reversing the polarity thereof;

first delaying means for delaying by a predetermined time period the signal obtained from said coefficient means;

first adding means for adding the signal delayed by said predetermined time period by said first delaying means to said input image signal;

second delaying means for delaying the signal obtained from said first adding means by said predetermined time period;

second adding means for adding the signal delayed by said second delaying means to said signal from said coefficient means to output a second-order differential signal of said input image signal;

first non-linear converting means for generating a square root component signal of the second-order differential signal obtained from said second adding means;

subtracting means for subtracting the signal from said first delaying means from the signal from said coefficient means to output a first-order differential signal of said input image signal;

absolute value generating means for generating an absolute value component signal of the first-order differential signal obtained from said subtracting means;

third delaying means for delaying the absolute value component signal from said absolute value generating means by one half of said predetermined time period;

second non-linear converting means for generating a square root component signal of the signal delayed by said third delaying means;

multiplying means for multiplying the square root component signal from said second non-linear converting means with the square root component signal from said first non-linear converting means to output an outline compensation signal; and means for adding said outline compensation signal to said input image signal to generate said outline-compensated image signal.

2. An outline compensation circuit as claimed in claim 1, wherein said first delaying means and said second delaying means delay the signals obtained from said coefficient means and from said first adding means by $2\tau$, where $\tau = \frac{1}{4}f$ and f is the emphasizing frequency, and said third delaying means delays the absolute value component signal from said absolute value generating means by $\tau$.

3. An outline compensation circuit as claimed in claim 1, wherein said first delaying means and said second delaying means delay the signals obtained from said coefficient means and from said first adding means by 2H, where H is a horizontal scanning period, and said third delaying means delays the absolute value component signal from said absolute value generating means by H.

4. A method of generating an outline-compensated image signal from an input image signal so that an outline of an image represented by said input image signal is emphasized without emphasizing a level of a frequency component corresponding to said outline, said method comprising the steps of:

(a) reducing the level of the input image signal by one half and reversing the polarity thereof;

(b) delaying by a predetermined time period the reduced-level reverse-polarity signal:

(c) adding the signal delayed by said predetermined time period to the input image signal;

(d) delaying the signal obtained in step (c) by said predetermined time period;

(e) adding the signal obtained in step (d) to the signal obtained in step (a) to output a second-order differential signal of said input image signal;

(f) generating a square root component signal of said second-order differential signal;

(g) subtracting the signal obtained in step (b) from the signal obtained in step (a) to output a first-order differential signal of said input image signal;

(h) generating the absolute value component signal of said first-order differential signal;

(i) delaying the absolute value component signal obtained in step (h) by one half of said predetermined time period;

(j) generating a square root component signal of the signal obtained in step (i);

(k) multiplying the square root component signal obtained in step (j) by the square root component signal obtained in step (f) to output the outline compensation signal; and (l) adding said outline compensation signal to said input image signal to generate said outline-compensated image signal.

* * * * *